Figure 6:
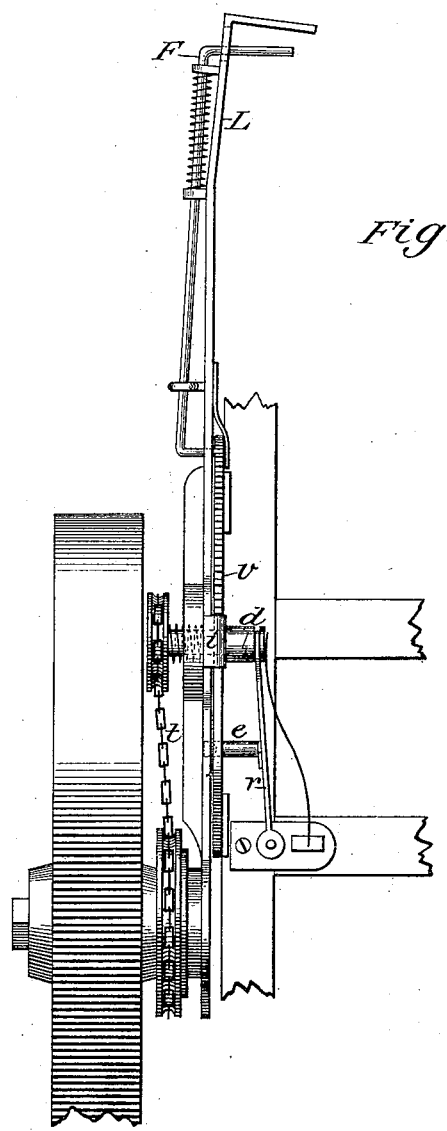

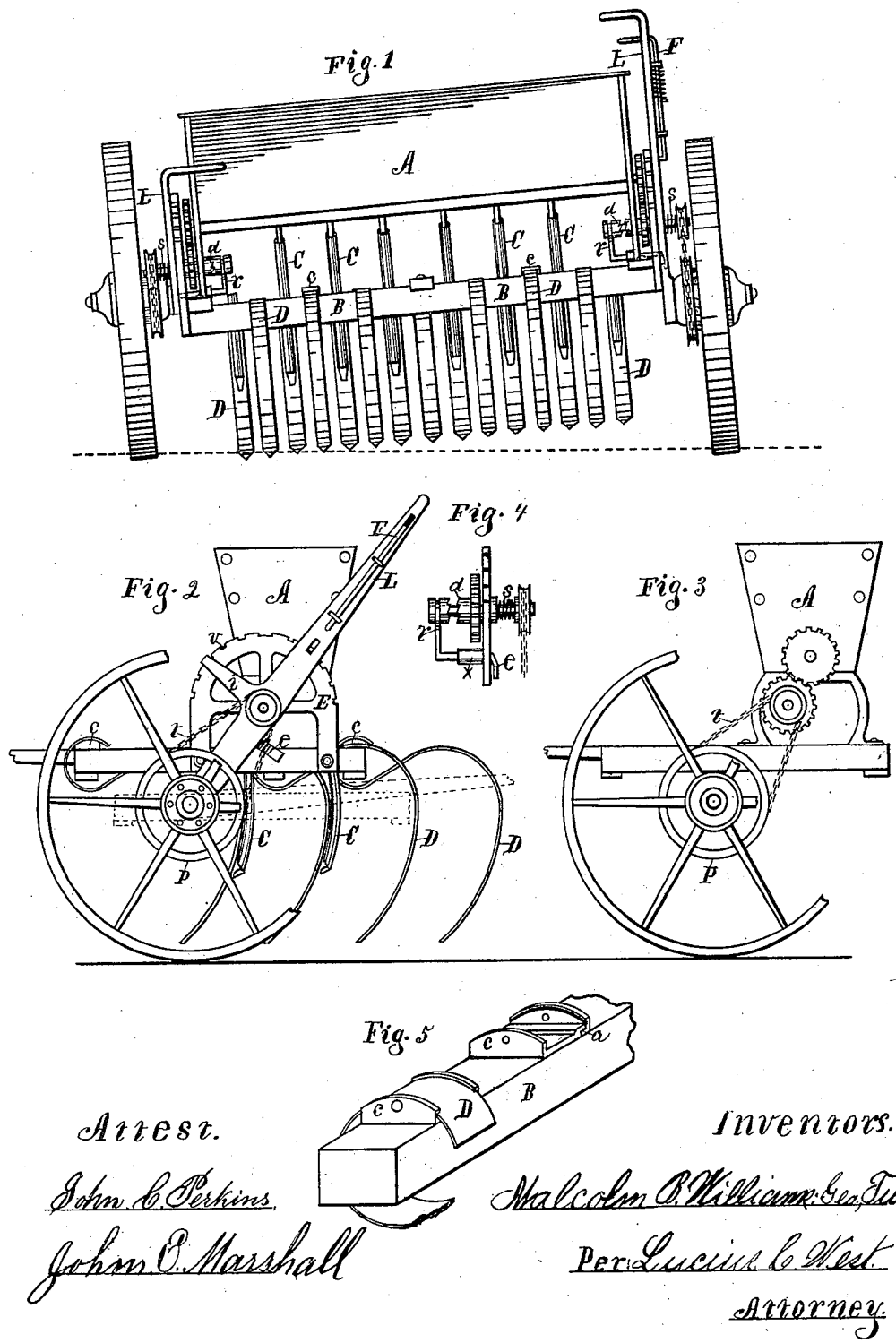

(Model.) 2 Sheets—Sheet 2.

M. B. WILLIAMS & G. TURNER.
Spring Tooth Grain Drill.

No. 242,572. Patented June 7, 1881.

Witnesses:
John H. Chase
Wm L Fisher.

Inventors:
Malcolm B. Williams.
George Turner.
Per: Lucius C. West,
Atty.

UNITED STATES PATENT OFFICE.

MALCOLM B. WILLIAMS AND GEORGE TURNER, OF KALAMAZOO, MICHIGAN, ASSIGNORS TO B. S. WILLIAMS & CO., OF SAME PLACE.

SPRING-TOOTH GRAIN-DRILL.

SPECIFICATION forming part of Letters Patent No. 242,572, dated June 7, 1881.

Application filed May 25, 1880. (Model.)

*To all whom it may concern:*

Be it known that we, MALCOLM B. WILLIAMS and GEORGE TURNER, respectively of Kalamazoo, Michigan, have jointly invented a new and useful Spring-Tooth Grain-Drill, of which the following is a specification.

The object of our invention is, first, to effect a contraction of the share-frame by extending the teeth from one beam over the next beam, substantially in the manner explained; second, to associate flexible or yielding grain-tubes with yielding spring-teeth in a manner to coact, as hereinafter described, in seeding the ground; third, the combination and arrangement of the lever which raises the feed-box, the drive and driven wheels, feed-shaft, and an arm, one end of which engages said lever, the other end a clutch-joint on feed-shaft in such a manner that the raising of said feed-box is effected by the same lever which controls the acting of the feed-shaft, all in the same operation; fourth, the construction of an adjusting-clip which opens laterally from the edges of the tooth or share which it clamps, thus entirely disengaging itself from said tooth, whereby an easy adjustment is effected. We effect these several objects by the construction and combination substantially as illustrated in the accompanying drawings, forming a part of this specification, in which—

Figure 1 is a rear-face view of our spring-tooth drill, showing one end elevated in position for turning around. Fig. 2 is an end view, showing arrangement of lever and edge view of the tooth we prefer to use; Fig. 3, an end view with lever and ratchet-plate detached; Fig. 4, a clutch-joint and its connections; Fig. 5, the clip secured to a girt or frame; and Fig. 6, an enlarged view, showing the construction of the lever, driven wheel, and clutch-joint, and their relationship with each other.

B is the tooth-frame, having usually four girts, to which the teeth D are secured in their relative position as to line of draft, as seen in Fig. 1. To this frame B is secured ratchet-plate E, in which plate the axle of the driven wheel is located, the same passing loosely through lever L, around which axle said lever turns. The lower end of this lever L terminates with the axle of the wheel to the drill. By this arrangement—power applied to the upper end of said lever—the drill constitutes the weight and the wheel-hub the fulcrum, by which means the teeth-frame and drill-box A secured on the same (shown in Fig. 3) are all raised together, instead of the drill-box remaining stationary and the teeth and their frame being raised beneath. Also, by this arrangement of leverage, the distance from the drive-wheel P on the wheel-hub and the driven wheel above is never altered.

At the inner end of the axle of the driven wheel is located a clutch-joint, $d$, the inner half being firmly secured to said axle and the other half secured to the cog-wheel revolubly located on said axle between the support of the seed-box A and the ratchet-plate E, said cog-wheel engaging a cog-wheel above, which drives the shaft of the drill-feed.

Between the driven wheel and lever L on said wheel's axle is a coil-spring, S, which assists in controlling the engagement of the notched portions of the clutch-joint $d$. With said clutch-joint is connected a forked and shouldered lever, $r$, the forked end loosely engaging a groove in said joint, and its other end terminating through ratchet-plate E, forming end $e$. When lever L is raised one end of the drill is raised, as shown in Fig. 1 and by dotted lines in Fig. 2, and at the same time said lever engages the end $e$ of lever $r$, pressing it in and opening the clutch-joint $d$, which throws the drill-feed out of gear, so that in turning directly around, letting the left-hand wheel in the drawings remain stationary, the drill-feed is inoperative; but if the left-hand wheel revolved forward, as the construction is the same at each end of the drill, the feed-shaft would keep revolving. By this arrangement, should either of the wheels run over a hollow or furrow in the ground and cease to revolve, by that end of the drill being temporarily supported by the teeth D the revolving of the feed-shaft would not cease, from the fact that power is imparted at both ends.

We construct our teeth D in something the form of a letter S, with its lower end elongated, by which construction the teeth from one girt extend over the girt in the rear of it, thus effecting a great contraction of the tooth-frame without shortening the teeth to a degree to rob them of their oscillating capacity. The grain-tubes C are formed and arranged substantially as shown in Figs. 1 and 2, by which construction and arrangement the grain is thrown against the lower back face of the tooth D or drill-hoe and falls in a scattered condition directly in the rear of said tooth, as specified in statement of objects.

The advantage and novelty we deem we have produced in this combination are explained as follows:

The curved spring-tooth has been found to be the most successful implement for working the soil, either in a seeder or a harrow, yet known, for reasons too well understood and too often repeated to need a repetition here. To effect a successful seeding of the ground with a drill using said teeth, we use flexible or hinged tubes C C and locate the same against or near the rear face of two rows of the spring-teeth, in order to throw the grain as specified.

The object of using flexible tubes is that rigid tubes resting against or near the teeth would prevent their oscillation or break said tubes. For these tubes rubber or leather tubing may be used, or any suitable material, or they may be hinged to effect the same result. The base of tube C, being constructed with an upward-turned convex lip, scatters the seed as it throws it against the tooth D, leaving it in the soil in rows thus scattered, or in a less compact mass than is the case with the old-style drill.

If parties using our device should not desire the grain scattered, the convex lip of the tube C may be concaved.

$c$ is our clip for adjustably holding teeth or shares to their girts or supporting-arms. Heretofore clips for this purpose have released the tooth by a horizontal, perpendicular, or vertical disengagement, and have been provided with fixed sides to engage the edges of the teeth to prevent lateral displacement. The fault of such clips is that often the side engagement with the tooth is so rigid that great strength is required to move or adjust the tooth in the clip, a hammer frequently being needed for the purpose. The use of our clip obviates this difficulty, from the fact that it has a lateral disengagement from the edges of its tooth by the base of one of its sides being shouldered to fit under a shoulder, $a$, of that portion of the clip which is secured to frame B, Fig. 5. The parts of the clip are held together by a bolt passing through holes shown in the drawings. When straight or convex teeth ends are used, or the clip is located on the side or under face of the girt, we construct them to conform to the changes, the novel features of the clip resting in its shouldered or mortised lateral engagement and adjustment of the tooth.

What we claim as novel, and desire to secure, is—

1. In a harrow or cultivator, the curved spring-teeth extending back from their supporting-beam over the next adjoining beam, substantially as shown and described, and for the object set forth.

2. The combination of lever L, the feed-shaft, and the drive and driven wheels with arm $r$, having its end $e$ engaging said lever L and its other end operating the clutch-joint of the feed-shaft, whereby the lever which raises and lowers the seed-box also controls the drill-feed, both at one operation.

3. In a spring-tooth drill, the spring-teeth, in combination with the flexible or yielding grain-tubes resting against their rear face and coacting with them, whereby the grain is thrown in its specified location without retarding the oscillation or spring of said teeth, substantially as set forth.

4. The tooth-beams provided with clips $c$, in combination with spring-teeth secured in said clips, and extending over the next contiguous beam, whereby a great contraction of the frame is effected and the teeth are readily adjusted.

5. The clip $c$, with the lower edge of its removable side shouldered and fitting under the mortise or groove of the base portion, engaging the tooth-beam, said clip adapted to conform to changes of location, as set forth.

MALCOLM B. WILLIAMS.
GEORGE TURNER.

Witnesses:
MOSES KINGSLEY,
JOHN E. MARSHALL.